United States Patent [19]
Taylor

[11] 3,719,514
[45] March 6, 1973

[54] STARCH BINDER COMPOSITION
[75] Inventor: Kelley G. Taylor, Decatur, Ill.
[73] Assignee: A. E. Staley Manufacturing Company, Decatur, Ill.
[22] Filed: June 29, 1970
[21] Appl. No.: 56,093

Related U.S. Application Data
[63] Continuation of Ser. No. 685,328, Nov. 24, 1967.

[52] U.S. Cl. .................. 106/210, 106/213, 106/214, 117/156, 260/17.3
[51] Int. Cl. ............................................. C09d 3/20
[58] Field of Search ...... 106/210, 213, 214; 117/156; 162/175; 260/17.3

[56] References Cited

UNITED STATES PATENTS

| | | | |
|---|---|---|---|
| 2,698,793 | 1/1955 | Landes | 260/2 EN |
| 2,897,162 | 7/1959 | Lowe et al | 260/2 EN |
| 3,063,854 | 11/1962 | Claxton | 106/213 |
| 3,320,080 | 5/1967 | Mazzarella | 106/213 |

OTHER PUBLICATIONS

R. L. Mellies, Mehltretter and Wolff, Periodate and Hypochlorite Oxidized Starch Industrial & Engineering – Chemistry, Vol. 50, No. 9, Sept. 1958.

Primary Examiner—Lorenzo B. Hayes
Attorney—Charles J. Meyerson

[57] ABSTRACT

An insolubilizable mineral coating composition useful in the manufacture of paper wherein the binder or adhesive portion of the coating composition is an anionic starch in combination with a polyalkylenimine. The polyalkylenimine is generally present in an amount of less than 10% by weight of the anionic starch and the anionic starch is preferably a starch material containing carboxyl groups.

3 Claims, No Drawings

STARCH BINDER COMPOSITION

This application is a continuation of application Ser. No. 685,328 filed Nov. 24, 1967, entitled *Starch Binder Composition*.

DISCLOSURE OF THE INVENTION

This invention relates to an improved wet-rub resistant paper coating system. More particularly, this invention relates to improved binders for use in paper coating systems.

In the manufacture of paper, mineral coatings are usually applied to a base paper stock to impart opacity and to provide a smooth and receptive surface for printing. Such paper coatings generally contain a mineral pigment and an adhesive which are applied together in the form of an aqueous dispersion. The adhesive serves to bind the pigment particles to each other and to the surface of the paper. For some applications, it is desirable and even necessary that the coating possess a substantial resistance to wet rubbing, i.e., resistance to abrasion when the coating is wet with water. The property of wet-rub resistance is especially important in paper or paperboard used for offset printing and for containers used in the frozen food industry or wherever a certain resistance to water or moisture is desired. Starch has been used for many years as the adhesive in paper coating systems. However, starch has one major drawback. When starch is used alone the coatings are generally not water resistant. It is, therefore, necessary to either derivatize the starch used or add to the coating system an agent which will insolubilize the starch material to make the coating water resistant.

The use of derivatized starches, and particularly the use of "cationic" starches as a binder with and without insolubilizing agents in paper coating compositions, is disclosed in a number of patents. For example, U.S. Pat. Nos. 3,052,561 and 3,320,080 disclose methods for coating paper with paper coating compositions containing insolubilized cationic starches. Also British Pat. No. 944,804 discloses the use of a cationic product obtained by reacting an oxidized starch with ethylenimine for coating paper. In each of the above patents an amine derivatized starch material was required to achieve satisfactory paper coating characteristics. Also, in each of the above patents, the starch material used as the binder material was characterized as being "cationic."

It is therefore an object of this invention to provide a water insolubilizable starch binder for use in paper coating compositions in which the paper coating compositions are characterized by their improved rheological properties and by improved wet-rub resistance.

Another object of this invention is to provide a water insolubilizable starch binder which is anionic in character and which, when used in paper coating compositions, improves wet-rub resistance.

Another object of this invention is to provide a method for coating cellulosic webs whereby the coating exhibits good rheological characteristics and improved wet-rub resistance.

Still another object of this invention is to provide a coated paper having improved wet-rub resistance especially suited for offset printing.

Another object of this invention is to provide a paper coating system which imparts to a paper's surface improved wet-rub resistance.

Other objects and advantages of this invention will be apparent from the description and examples to follow.

These and other objects of this invention are accomplished generally by the compositions and processes hereafter described.

More specifically, though, these and other objects are accomplished by the use of a paper coating composition containing a novel water insolubilizable starch binder and an inert mineral filler.

Basically, the water insolubilizable starch binder comprises in combination an anionic amylaceous material and a polyalkylenimine. The starch binder of this invention is distinguishable from binders heretofore proposed in that the granular amylaceous material retains its anionic characteristics. Preferably, the anionic amylaceous material is a modified starch material containing carboxyl groups in an amount of at least 0.05 percent based on the weight of the starch d.s. (dry substance) basis. Although a modified starch containing up to 10 percent or even 15 percent by weight carboxyl groups can be used, such high degrees of modification are generally unnecessary. In some instances these high degrees of modification should even be avoided, particularly if substantial degradation of the starch material accompanies the preparation of the modified starch material. In compositions in which the starch binder is used for formulating a paper coating composition, the modified starch possesses anionic properties and will preferably contain from between 0.3 to 4 percent by weight carboxyl groups based on the total weight of the starch d.s. basis. The carboxyl groups above referred to were quantitatively determined by the method described by R. W. Eyler, E. D. Klug and R. Diephus in Analytical Chemistry, Volume 19, page 24 (1947).

The polyalkylenimine is generally added to the anionic starch in an amount of at least 0.3 percent based on the weight of the modified starch material. Although the polyalkylenimine can be added in an amount as high as 20 percent by weight, very little, if any, improvement is noted at these high addition levels. For mainly economic reasons, the amount of polyalkylenimine is generally limited to an amount of 0.5 to 10 percent by weight and preferably between 1.0 and 5.0 percent based on the weight of the modified starch. One of the surprising features of this invention is that after the polyalkylenimine is combined with the anionic starch, the starch granules still exhibit anionic characteristics based on microscopic examinations later described in this disclosure.

The oxidized starch may be prepared by a number of different methods. A principal method is the hypochlorite oxidation of starch in which a suspension of granular starch is warmed with an aqueous alkaline bleach and then neutralized. For example, to an aqueous granular starch suspension at about 49 to 52°C. a bleach at a pH of 9.0 containing about 7.0 parts of chlorine to about 9.3 parts of caustic soda is added. At the conclusion of the reaction the suspension is neutralized to a pH of around 6. The hypochlorite treatment oxidizes a proportion of the hydroxyl groups on the starch molecule to carboxyl groups. The above method can also be used to introduce carboxyl groups into gelatinized starch.

Another method for preparing a modified starch containing carboxyl groups is disclosed in U.S. Pat. No. 3,071,573. By this method granular starch is reacted in the presence of water and an alkaline catalyst with an etherifying agent selected from the group consisting of the methyl and ethyl esters of crotonic and itaconic acids and the esters of acrylic acid. This process introduces a sodium carboxyalkyl ether substituent in the starch and, when the product is neutralized with acid, contains reactive carboxyl groups.

Still other methods of introducing the carboxyl group (as a carboxyalkyl ether) are disclosed in several other U.S. patents. In U.S. Pat. No. 2,654,736 (Caldwell), a beta-lactone is reacted with granular starch. In U.S. Pat. No. 2,660,577 (Kerr), a beta- or a gamma-lactone is reacted with commercially dried granular starch. In U.S. Pat. No. 2,773,057 (Hjermstad et al.), a monochlorine-substituted, saturated fatty-acid salt, such as sodium chloroacetate, is reacted with granular starch, the chloroacetate reaction yielding a carboxymethyl ether. Still another method produces what is referred to as a dicarboxyl starch. In this method U.S. Pat. No. 2,894,945 to Hofreiter et al.), a periodate-oxidized starch containing dialdehyde groups is treated with a water-soluble inorganic salt of chloric acid to produce dicarboxyl groupings.

The carboxy starch may be based on any of the native starches, corn, potato, wheat, rice, tapioca, waxy maize, high amylose, sorghum, etc. The starch fractions amylose and amylopectin can also be used. Carboxy starches based on derivatized and/or modified starches such as dextrins, acid or enzyme hydrolyzed starches, starch ethers, aldehydes, esters and acetals, may also be used. Examples of derivatized or modified starches which possess "anionic" properties and which may be used in formulating the composition of this invention include oxidized dextrins, carboxy hydroxyalkyl starches, dialdehyde starches containing carboxyl groups, carboxyl-cyanoalkyl starches, carboxyl acetyl starches, carboxyl aminoalkyl starches and the like. Sulfonated starches such as those obtained by reacting starch with a propane sultone derivative can also be used.

The polyalkylenimines suitable for use in formulating the starch binder composition of this invention include any self-polymerization product of an alkylenimine containing not more than four carbon atoms. Preferably the polymerization product is hydrophilic and slightly cationic in character. Such products include the following polyalkylenimines; polyethylenimine, polypropylenimine, polybutylenimine or mixtures thereof. However, polyethylenimine, for reasons of commercial availability and cost, is preferred.

Polyethylenimine is a self-polymer of ethylenimine having the formula:

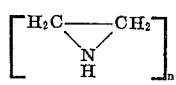

wherein $n$ is a number between 8 to 2500 and preferably a number between 14 to 100. Polyethylenimine has an average molecular weight varying between about 300 and 100,000 and is presumably chemically unreactive with anionic starches under normal conditions. This presumption is based on the fact that polyethylenimine is a branched chained polymer containing primary, secondary and tertiary nitrogens but does not contain the reactive "charged ring" possessed by the monomer.

The polyalkylenimines are prepared by carefully heating monomeric ethylenimine, propylenimine or butylenimine or mixtures thereof in the presence of a suitable polymerization catalyst for a time sufficient to form a self-condensation resin or polymer which is hydrophilic and slightly cationic in character. The polymerization is stopped before the polymer or resin exhibits substantial hydrophobic characteristics. The end point may readily be found by testing the resin for these properties or by viscosity measurements of the resin. A suitable resin has a viscosity of 6.0–120 seconds, measured by the fall time of a 3 mm. steel ball through 20 mm. of a 20 percent aqueous solution of the polymer at 20°C. Polyethylenimine is available commercially under various trade names.

The insolubilizing agents which can be used for insolubilizing the polyalkylenimine-starch combination include a variety of well known insolubilizing agents. For example various aldehyde type insolubilizing agents such as paraformaldehyde, formaldehyde, glyoxal, glutaraldehyde, and acrolein, etc., can be used. Partially oxidized starches or starches which contain aldehyde radicals such as the dialdehyde starches can also be used to advantage. Salts of polyvalent metals such as chromic chloride, aluminum chloride, zinc chloride, potassium pyroantimonate, ammonium zirconium carbonate, zirconium acetate, zirconium chloride, zirconyl chloride and the like, as well as thermosetting resin precursors containing a plurality of reactive methylol groups such as urea-formaldehyde resins, melamine-formaldehyde resins, phenol-formaldehyde resins, ketone-formaldehyde resins, and resorcinol-formaldehyde resins, and the like can be used. Water soluble polymers such as the styrene maleic anhydride copolymers and polyamide resins such as the polyamidamineepichlorohydrin condensates can also be used.

Also applicable for use are various combinations of any of the above described insolubilizing agents as well as the commercially available mixtures of urea and formaldehyde. It may be noted that both aldehydes and thermosetting resin precursors such as those enumerated above are the preferred insolubilizers for use in the process of this invention.

When the binder composition of this invention is incorporated in a paper coating composition, the paper coating composition generally contains a pigment material such as zinc oxide, kaolin clay, barium oxide, calcium carbonate, lithopone (mixture of zinc sulfide and barium sulfate) and titanium dioxide. Colored pigments such as chromium oxide, iron oxide, etc., may also be employed. These pigments, as well as many others, may be utilized either alone or in combination with one another. The predispersed HT clay from Minerals and Chemicals Philipp Corporation and the Georgia Kaolin Clays have been highly satisfactory.

Synthetic latexes such as the styrene-butadiene latex, Air Reduction's Aircoflex (copolymer of ethylene and vinyl acetate), Rohm & Haas' Acrylic B–15 (acrylate) emulsion, Vinac 880 (polyvinyl acetate homopolymer) and other synthetic latexes may replace, in part, the polyalkylenimine-starch combination used in preparing paper coating colors. Most any ratio of starch to synthetic latex may be used. For example, a ratio of between 0.01 to less than 5 parts latex per part of starch can be used. However, a range of between 0.1 to 2.0 parts of latex per part of starch is preferred. The ratios of starch and latex are reported on a dry substance basis. The presence of the latex in a paper coating composition affects not only the wet-rub resistance of the composition, but also the composition's viscosity. For example a ratio of 70 parts of the polyalkylenimine-starch combination to 30 parts styrene-butadiene latex has been found to not only improve the wet-rub resistance of the finished coating but also tends to lower the viscosity of the color. However, some of the other synthetic latexes, such as Rohm & Haas' Acrylic B–15, tends to increase the color's viscosity while improving the color's wet-rub resistance.

The polyalkylenimine-starch combinations may be prepared in either granular or pasted form. A granular polyalkylenimine-starch combination can be obtained by utilizing either a dry or wet blending method. In dry blending, a polyalkylenimine is combined with an anionic starch by spraying. For example, an aqueous solution of polyethylenimine can be sprayed on granular oxidized starch at a temperature of between about 23–30°AC. As the polyethylenimine is deposited on the granular starch the starch is continuously mixed or tumbled to insure uniform distribution of the polyethylenimine on the starch. In the wet blending method, an aqueous solution of polyethylenimine can be added to an aqueous slurry of granular starch. The mixture is then adjusted to a pH of 6.0 and stirred at elevated temperatures (no higher than 54.5°C. [130° F.]) for two or three hours. The slurry is filtered and then dried.

If a polyalkylenimine-starch combination in pasted form is desired, the above prepared granular materials may then be cooked at a temperature of between 80–100° C. for 20–30 minutes. If desired, the product can then be dried as by roll drying and particulated. Paper coating compositions incorporating the starch-polyalkylenimine binder composition of this invention can be prepared by first pasting the starch binder composition by heating an aqueous slurry of the granular starch material for 20–30 minutes at a temperature of 80–90° C. However, if the starch material has previously been pasted and is in dry form, all that would be required in this instance would be the addition of water with stirring. A mineral suspension is separately prepared with a high solids content of pigment; for example, this may be a 70 percent clay slip, the balance being water.

Where pigments are added to the coating composition in an agglomerated state and where it is not practical to mechanically mill the pigments, dispersing agents such as sodium hexametaphosphate, trisodium polyphosphate, tetrasodium pyrophosphate or the corresponding potassium salts may be added. In addition, an alkaline ammonium hydroxide or a material such as a salt or hydroxide of an alkali metal such as sodium hydroxide, potassium hydroxide and the like may be added. The dispersing agent along with the alkaline material tend to break up and disperse the agglomerates. In addition, the alkaline material can serve to adjust the pH of the coating composition. Various other additives such as defoamers and preservatives may be included in the coating composition, if desired. A more complete discussion of methods for preparing the pigment suspension can be found in *Pulp and Paper*, Volume 2, Chapter XVIII, pages 1024–1025 (1952) James P. Casey.

After the pigment suspension and starch paste are combined, some additional dispersant may be added to the combination, if desired.

Finally, the selected insolubilizing reagent is mixed with the clay slip containing the polyalkylenimine-starch binder. Although it is preferred to add the insolubilizer at this point, it is not essential and other sequences for adding the insolubilizer, or for that matter the other ingredients, may be followed if desired.

If a synthetic latex is to be added, it is generally added at this point. As previously noted, the synthetic latex should be one which is compatible with the polyalkylenimine-starch combination. Frequently, a soap, such as sodium stearate, calcium stearate (Nopco C–104) and the like is also added to prevent sticking or dusting during the process of supercalendering.

The amount of starch binder used in formulating the composition of this invention is normally that amount which is normally used when conventional starch is used in formulating a paper coating composition. The preferred range is about 15 to 20 percent starch binder based on the weight of clay. However, useful results are obtained with as little as 10 percent starch binder; and while more than 20 percent may be used with improved results, this larger amount dilutes the pigment deposited and is more expensive. The solids content of the coating composition depends to some degree on the method used for applying the coating to the paper. Conventional proportions of between 40 to 55 percent solids are satisfactory.

The proportion of insolubilizing agent used will vary depending on the type of insolubilizing agent used and the degree of insolubilization desired. For example, if an aldehyde type in-solubilizer is employed an amount ranging from 5–25 percent based on the weight of the starch is used. However, if the insolubilizer is a mineral salt such as zirconium chloride, chromium chloride, etc., as little as 1 percent of the metal (expressed as the oxide) based on the weight of the starch can be used. This amount, however, can vary to some degree from between 0.5 to 2.0 percent depending on the method by which the mineral salt is added or the carboxyl content of the starch material used in formulating polyalkylenimine-starch combination.

The desired pH range of the final formulation will depend upon the particular insolubilizing agent used, the method employed in adding the polyalkylenimine to the anionic starch, etc. In general, though, the pH will be in the order of from about 4.0 to 9.0 with the preferred range being about 5.0 to 7.0. When the coating composition is neutral or slightly basic, it is generally advantageous to include in the color formulation a coating catalyst such as ammonium nitrate, ammonium chloride, etc. These salts tend to improve the color's wet-rub resistance at neutral or at a slightly basic pH.

The binder composition of this invention is used, as has been previously indicated, in the formulation of paper coating compositions. These coating compositions are applied to paper or paperboard by techniques and systems well known in the paper industry. For example, a size press, air knife, rollers, trailing blade, etc., can be used.

After the paper has been coated, it is dried. Normally, drying which is obtained on a commercial coater is sufficient to cure and thus insolubilize the starch bound system. On a smaller scale drying and insolubilization can be accomplished by passing the coated paper over a steam heated roll (80°–90°C.) for a period of from 1–3 minutes. If the coated paper is dried at room temperature or at slightly elevated temperatures several hours or even days may be required to obtain maximum wet-rub resistance. Calendering between heated rolls may also be used for drying if desired.

The wet-rub resistance of the papers coated was determined by using a modification of routine control method RC-184 of the Technical Association of the Pulp and Paper Industry. This routine control method employs an instrument known as the Taber Abraser. This machine has a horizontal rotating table, to which a sample may be clamped, and a counting mechanism to record the number of rotations of the table. Above the table there is a weighted, pivoted arm on which a rubbing element may be mounted so that it bears against the sample on the sample table during rotation. The pressure exerted by the rubbing element is adjustable by means of counterweights hung from the arm. The routine control method described in the Technical Association issuance employs a brush as the rubbing element. In the tests performed for this invention, two rubber wheels were used, with the wheel rotating against the surface of the coated paper sample. The resistance to wet-rub was determined by mounting a circular piece of the coated paper on the horizontal rotating table and covering the specimen with 15 ml. of distilled water. With the rubber wheels bearing against the specimen, the horizontal table is rotated a predetermined number of times. Evaluations were made at 10, 20, 50 and 100 revolutions. The wet-rub resistance was expressed as the number of milligrams of coating removed for a specified number of revolutions. The amount of coating removed was determined by first taring a circular coated specimen (4⅛ inches in diameter) after it had come to a moisture equilibrium in an atmosphere of 50 percent relative humidity. This sample was then placed on a Taber Abraser for a predetermined number of rubbing revolutions. The sample was removed from the Taber Abraser, brought to a moisture equilibrium in an atmosphere of 50 percent relative humidity, and reweighed. The difference in weight (in milligrams) represents the sample's wet-rub resistance. Samples having a small loss in coating indicate a high resistance to wet-rub.

As previously indicated, one of the features which distinguishes the binder composition of this invention from the compositions disclosed in the prior art is that the starch material used in formulating the binder composition retains its anionic character even after the starch material is combined with a polyalkylenimine.

The anionic characteristics of the starch material were determined by a microscopic examination of the starch granules after the starch granules have been treated with a positively charged organic dye. For example, when an anionic starch is treated with a methylene blue, the starch granules will stain a moderately uniform dark blue. However, when a cationic starch is treated with methylene blue, the starch granules are unaffected by the positively charged dye. When a cationic starch is treated with a negatively charged organic dye such as "light green SF yellowish" dye, the cationic starch granules take on a greenish color. However an anionic starch granule will not be affected by a negatively charged dye. By the use of dye staining, a convenient means is available for quickly determining the ionic character of the starch granule. A more thorough discussion on the use of color indicators for determining the ionic character of the starch granule can be found in *Analytical Chemistry*, Volume 28, pages 386–387, March, 1956, by Schoch and Maywald.

The following examples are given for the purpose of illustration only and are not to be interpreted as specific limitations to this invention.

EXAMPLE 1

A paper coating composition having an anionic binder comprising an oxidized starch and polyalkylenimine was prepared in the following manner:

The starch-polyalkylenimine binder was prepared by spraying 210 parts of an aqueous 25 percent solution of polyethylenimine on 3500 parts of sodium hypochlorite oxidized corn starch having a carboxyl content of 1.03 percent. It was determined by nitrogen assay that 1.56 percent by weight of polyethylenimine was combined with the oxidized starch material.

Microscopic examinations of the starch-polyethylenimine granule, after being treated with either methylene blue or with a light green SF yellowish indicator obtained through Matheson, Coleman & Bell, indicated that the starch-polyethylenimine granules still possessed anionic characteristics.

Sixteen parts of the above prepared binder composition was suspended in 64 parts of water. The aqueous suspension was adjusted to a pH of 4.0 and pasted on a steam bath. The pasted starch material was then cooked for an additional 30 minutes at a temperature which peaked at 95°C.

The coating composition was prepared by suspending 100 parts of a predispersed clay in water at 70 percent solids in a color mixing container equipped with an electric stirrer. While stirring, 0.1 percent Pluronic L61 defoamer (based on weight of starch) was added. This was followed by the slow addition of all the above prepared binder composition. Seventeen percent of Parez 613 resin (melamine-formaldehyde resin) and 6.0 percent ammonium nitrate, both based on the weight of the starch at 12 percent moisture, were then added and the color allowed to stir two hours at an adjusted pH of 5.0. At the end of the two hour period the pH was readjusted to 7.0 with ammonium hydroxide and enough water added to lower the solids of the color to 40 percent. After stirring for a period of time up to 30 minutes, the Brookfield viscosity was found to be 266 cps. at 20 r.p.m. and 158 cps. at 100 r.p.m., measured at 26°C. with No. 2 spindle. If latex is to be incorporated into the binding system, it has been found that it is best to add the latex after the insolubilizer and ammonium nitrate have been added. If a lubricant such as ivory soap, calcium stearate, wax emulsion, etc., is used it should be introduced into the color formulation at this point. Preferably the lubricant is added before the dilution water is added.

Using a No. 10 wire wound rod, the above coating composition was applied onto sheets of 45 lb. bleached Kraft obtained from the West Virginia Pulp and Paper Co. The coated sheets were dried on a Noble and Wood drum at 82°C. for a time of 3 to 4 minutes. Using a Taber Abraser according to the procedure heretofore described, the wet-rub resistance of the coating was determined to be 1, 2, 4, and 5 milligrams of coating removed for 10, 20, 50 and 100 revolutions respectively. The coating compositions possessed excellent rheological properties and good shock characteristics.

EXAMPLES 2 – 8

The procedure described in Example 1 was repeated except that the amount of polyethylenimine was varied from 0 through 20 percent based on the weight of the starch. In this series a calculated amount of polyethylenimine was dissolved in water to which the oxidized starch was added. The starch-PEI slurry was then cooked for 30 minutes at pH 4. One part of Calgon was added to the clay slip before the pasted starch-polyethylenimine combination was added. The solids content of the coating compositions was adjusted to a 50 percent level and mixed for two hours at a pH of 5.5. The paper coating compositions were then applied to paper according to the procedure in Example 1 and the wet-rub resistance of each coating was determined as previously described. The results are reported in Table 1 below.

TABLE I

Various Amounts of Polyethylenimine (PEI)

| examples | % PEI* | Taber Abraser Wet-Rub No. of Revolutions | | | |
|---|---|---|---|---|---|
| | | 10 | 20 | 50 | 100 |
| 2 | 0 | 10 | 13 | 18 | 22 |
| 3 | 0.3 | 6 | 9 | 12 | 12 |
| 4 | 1.5 | 4 | 3 | 5 | 6 |
| 5 | 3.0 | 1 | 4 | 4 | 5 |
| 6 | 10.0 | 3 | 4 | 7 | 7 |
| 7 | 15.0 | 3 | 4 | 7 | 7 |
| 8 | 20.0 | 4 | 4 | 8 | 9 |

*Based on total weight of starch d.s. basis.

It can be seen from the above results that the coating's wet-rub resistance was substantially improved by the addition of polyethylenimine and that optimum wet-rub resistance was obtained when polyethylenimine was used in amounts of between 1.0 and 10 percent by weight. Amounts of polyethylenimine greater than 10 percent by weight gave no significant improvement in the coating's wet-rub resistance.

EXAMPLES 9 – 13

The coating compositions were prepared in the same manner as those of Examples 2 – 8 and illustrate the usefulness of anionic and oxidized starches other than the more common hypochlorite oxidized corn starch as previously described. In Examples 9 and 10 a quaternary potato starch having a carboxyl content in the range of 0.7–1.0 percent was used, and having a nitrogen assay of about 0.25 percent was used. In Example 9 the oxidized potato starch derivative was not combined with PEI, while in Example 10 the oxidized potato starch derivative was cooked with 1½ percent PEI, based on the weight of the starch. Table II shows the improvement in wet-rub resistance of the applied coating containing PEI over the one containing no PEI. Example 11 is a coating based upon a propane sultone derivative of an acid modified corn starch. The anionic nature of this sulfonated starch in combination with PEI results in a coating composition which provides wet-rub resistance comparable to the carboxylated starch-PEI compositions. Examples 12 and 13 are coatings based upon a quaternary derivative of tapioca starch (nitrogen assay of about 0.25 percent) and having a carboxyl content in the range of 0.7–1.0 percent. The oxidized quaternary tapioca starch used in coating No. 13 was cooked with 0.3 percent polyethylenimine, whereas in coating No. 12 no polyethylenimine was used.

TABLE II

Anionic Starch Derivatives Other Than Oxidized Corn Starch

| Examples | % PEI* | Wet-Rub Resistance Mg./Cycle Tested | | | |
|---|---|---|---|---|---|
| | | 10 | 20 | 50 | 100 |
| 9 | 0 | 7 | 8 | 9 | 22 |
| 10 | 1.5 | 5 | 6 | 6 | 7 |
| 11 | 1.5 | 5 | 7 | 9 | 12 |
| 12 | 0 | 5 | 6 | 8 | 10 |
| 13 | 0.3 | 1 | 2 | 4 | 4 |

*Based on weight of starch d.s.b.

EXAMPLES 14 – 19

The following comparative examples show that still further improved wet-rub characteristics can be obtained by replacing a portion of the starch-PEI binder with a synthetic latex. In Examples 16 and 18, 30 percent of the starch-PEI was replaced with the synthetic latex. In Example 19, all of the starch-PEI was replaced with a synthetic latex. In Examples 15 and 17, an oxidized starch without PEI was used. However, in Example 17, 30 percent of the starch was replaced with a synthetic latex. Except for the above modifications the procedures described in Example 1 were followed. The paper coating compositions were evaluated with a Taber Abraser and the results reported in Table III.

TABLE III

Effect of PEI and LATEX on Wet-Rub Characteristics

| Examples | % PEI¹ | Synthetic Latex | Taber Abraser Wet-Rub No. of Revolutions | | | |
|---|---|---|---|---|---|---|
| | | | 10 | 20 | 50 | 100 |
| 14 | 1.5 | None | 3 | 4 | 7 | 8 |
| 15 | None | None | 6 | 10 | 20 | 60 |
| 16 | 1.5 | Latex 636² | 2 | 3 | 3 | 4 |
| 17 | None | Latex 636 | 8 | 19 | 30 | torn⁴ |
| 18 | 1.5 | B-15 Acrylic³ | 3 | 2 | 4 | 6 |
| 19 | None | B-15 Acrylic | 35 | 51 | 70 | torn⁴ |

[1] Based on weight of starch d.s.
[2] Styrene-butadiene latex supplied by Dow Chemical
[3] Acrylic resin supplied by Rohm & Haas
[4] Torn at a value of above 70

EXAMPLES 20 – 26

In these examples, various types and amounts of insolubilizing agents were examined. Their effect on the coating composition wet-rub characteristics are reported in Table IV. Except for the variations reported in Table IV, the paper coating compositions were prepared in accordance with the procedures reported in Example 1.

TABLE IV

Effect of Insolubilizing Agents on Coatings Wet-Rub Characteristics

| Ex. | insolubilizer based on wt. of starch | viscosity* 20 rpm | 100 rpm | taber abraser wet-rub no. of revolutions 10 | 20 | 50 | 100 |
|---|---|---|---|---|---|---|---|
| 20 | 17% Parez 613[1] | 3,530 | 1,300 | 1 | 3 | 3 | 4 |
| 21 | 10% glyoxal 40%[2] | 12,750 | 3,690 | 3 | 5 | 8 | 11 |
| 22 | 17% Glyoxal 40%[2] | 15,000 | 4,000 | 4 | 5 | 8 | 16 |
| 23 | 20% UF-85[3] | 2,640 | 1,064 | 4 | 5 | 11 | 14 |
| 24 | 17% glutaraldehyde | 18,500 | 4,630 | 4 | 5 | 10 | 12 |
| 25 | 17% urecall AS[4] | 1,024 | 525 | 3 | 5 | 8 | 12 |
| 26 | 17% sumstar-190[5] | 2,300 | 1,030 | 2 | 4 | 8 | 11 |

*Viscosity measured on a Brookfield viscometer with a No. 5 Spindle at 20 and 100 RPMs and a temperature of 23°C.
[1] melamine-formaldehyde resin (American Cyanamid Co.)
[2] 40% solution of Glyoxal in water (Union Carbide Corp.)
[3] Urea formaldehyde resin former 85% solids (Allied Chemical Corp.)
[4] Urea formaldehyde resin (Badische Anilin & Soda Fabrik A. G. Germany)
[5] Dialdehyde Starch (Miles Laboratories, Inc.)

EXAMPLES 27 – 34

These examples demonstrate that the carboxyl content of the anionic starch can be varied over a broad range without adversely affecting the paper coating composition's resistance to wet-rub. However, these examples also demonstrate that the carboxyl content of the anionic starch does affect the composition's rheological and adhesive properties. Finally, these examples show that if optimum wet-rub resistance is to be obtained and if good adhesive and rheological properties are to be retained, the starch material should preferably contain between about 0.3 and 1.5 percent by weight of the starch material d.s.b.

The procedure followed in preparing the paper coating compositions reported in Table V was essentially the same as that presented in Example 1. The paper coating composition contained 50 percent solids with an adhesive level of 16 percent. The insolubilizer (Parez 613) was present in an amount of 15 percent and the PEI in an amount of 1.5 percent, both percentages being based on the weight of the starch d.s.b.

The paper coating properties of these compositions were evaluated and the results reported in Table V below:

TABLE V

| Example | Carboxyl* Content | Wet-Rub Properties | Viscosity Properties | Adhesion Properties |
|---|---|---|---|---|
| 27 | 0.1 | Good | Too High | Good |
| 28 | 0.2 | " | " | " |
| 29 | 0.3 | " | Good | " |
| 30 | 0.5 | " | " | " |
| 31 | 0.8 | " | " | " |
| 32 | 1.2 | " | " | " |
| 33 | 1.5 | " | " | " |
| 34 | 2.0 | " | " | Fair |

*The carboxyl content is expressed as weight percent based on weight of the starch d.s.b. The carboxyl groups were obtained by hypochlorite oxidation.

The above compositions were evaluated for use on commercial paper coating machines, and it was generally found that although all of the above examples possessed good wet-rub characteristics, the compositions of Examples 27 and 28 were generally too viscous for most coating operations, while the composition of Example 34, although having a good workable viscosity, possessed poorer adhesive qualities. However, coating compositions having a carboxyl content of between 0.3 and 1.5 possessed not only good overall working properties, but also good wet-rub characteristics.

Since many embodiments of this invention may be made and since many changes may be made in the embodiments described, the foregoing is interpreted as illustrative and our invention is defined by the claims defined hereafter.

What is claimed as new is:

1. An insolubilizable anionic starch binder consisting essentially of an anionic starch containing between 0.3 to 4 percent by weight of carboxyl groups based on starch dry substance and from 0.3 percent to 20 percent based on the weight of starch dry substance of polyalkylenimine in which the alkylenimine is selected from the group consisting of ethylenimine, propylenimine and butylenimine and mixtures thereof and which has a degree of polymerization in the range of 14 to 100.

2. The composition of claim 1 wherein the modified starch is an oxidized starch.

3. The composition of claim 1 wherein the polyalkylenimine is present in an amount of between 0.5 and 10.0 percent based on the weight of the starch.

* * * * *